United States Patent [19]

Tingley

[11] 4,261,417

[45] Apr. 14, 1981

[54] DEVICE FOR PREVENTING DAMAGE DUE TO ROOF ICE DAMS

[75] Inventor: Frederick M. Tingley, Lincoln, Mass.

[73] Assignee: Tindev, Inc., Lincoln, Mass.

[21] Appl. No.: 116,608

[22] Filed: Jan. 29, 1980

Related U.S. Application Data

[63] Continuation of Ser. No. 939,424, Sep. 5, 1978, abandoned.

[51] Int. Cl.³ .................. F24H 3/00; F28D 15/00; F24J 3/02
[52] U.S. Cl. .................. 165/47; 165/105; 126/417; 126/433; 52/24; 52/173 R
[58] Field of Search .................. 126/433, 417, 432; 165/47, 105; 52/15, 24, 173

[56] References Cited

U.S. PATENT DOCUMENTS

| | | | |
|---|---|---|---|
| 3,195,619 | 7/1965 | Tippmann | 165/105 |
| 3,388,738 | 6/1968 | Dery | 165/47 |
| 3,815,671 | 6/1974 | Turner | 165/47 |
| 3,837,311 | 9/1974 | Lea, Jr. | 165/105 |
| 4,119,085 | 10/1978 | Knowles et al. | 126/433 |
| 4,127,105 | 11/1978 | Watt | 165/105 |
| 4,162,684 | 7/1979 | Loveless, Jr. | 126/417 |

*Primary Examiner*—James C. Yeung
*Attorney, Agent, or Firm*—Hamilton, Brook, Smith & Reynolds

[57] ABSTRACT

This invention relates to the prevention of damage caused by ice dams formed from snow and ice at the eaves of houses in colder climates. It consists of a highly heat-conductive bar with an efficient solar heat collector at one end and optionally an efficient collector of waste roof heat at the other. The device is located at the edge of a roof with the solar collector extending beyond the roof edge and the heat collector located toward the center of the roof. Collected energy is conducted along the bar and to its sides where it melts the surrounding ice and provides a tunnel in the ice through which otherwise trapped water flows from the roof. This water might otherwise leak through the roof and into the house where it might do considerable damage.

12 Claims, 3 Drawing Figures

DEVICE FOR PREVENTING DAMAGE DUE TO ROOF ICE DAMS

This is a continuation of spplication Ser. No. 939,424, filed Sept. 5, 1978, abandoned.

BACKGROUND OF THE INVENTION

1. Field of the Invention

This invention is in the field of snow and ice melting equipment and more particularly relates to the melting of passages through ice dams which form on building eaves so as to relieve the dammed water and prevent damage caused by this water leaking into the building.

2. Description of the Prior Art

A common problem with buildings, including houses, in the colder climates has been the buildup of ice near eaves and a consequent damming of the melted snow above above the buildup. Snow on the central portion of the roof is melted by a combination of the sun's energy and heat conducted through the roof from the warm living quarters. This melt flows down the roof to the eaves where some of it is absorbed by the snow there. The eaves are frequently colder than the upper portion of the roof because of reduced heating from the interior of the building and this soggy snow freezes into dense blocks called ice dams. Large puddles of melt are created behind these dams and sometimes extend up into the overlapping shingles far enough to damage shingles and cause severe leaking into the house. This often results in significant damage to the interior structure, finishing, and furnishings.

The usual method for relieving this problem is chopping the ice away and allowing the water to run off. This operation, high on an ice covered roof, is dangerous, and must be repeated fairly frequently. Additionally, unless care is exercised, the roof shingles will be damaged.

A second method of preventing damage is the installation of wide metal flashing along and extending above the eaves. This does not prevent the ice dams, but usually keeps the water from leaking into the house by providing a continuous barrier to the water. The installation is expensive and sometimes unattractive.

Another common method of deafeating these ice dams is the installation of electric heating wires on the roof at the eaves. This is generally very effective at breaking the dams, but the units are fairly expensive to purchase and install. Attention must be paid to the snow conditions on the roof in order to switch power on and off when necessary. Frequently the electricity is left going throughout the winter, consuming a considerable amount of electric energy. The wires also present an electric shock and fire hazard.

SUMMARY OF THE INVENTION

It is an object of this invention to provide an inexpensive yet reliable device for overcoming ice dams. It is a further object to provide a device which will not require the consumption of costly energy. It is still a further intention of this invention to provide a device which is simple in design so as to be inexpensive to manufacture and reliable in operation. It is yet a further intention that this invention be easy to install and produce a minimal hazard to people and property.

Thus, the invention relates to a solar powered device having heat collectors, a good heat conductor, and a heat radiator, the combinatin of which collects heat from the sun and optionally waste heat from the roof and conducts it to the location of the ice blockage and into the ice so as to melt a tunnel through the dam. This allows melt water to flow through the tunnel and away, rather than under the shingles and into the house.

DESCRIPTION OF PREFERRED EMBODIMENTS

Figure 1:
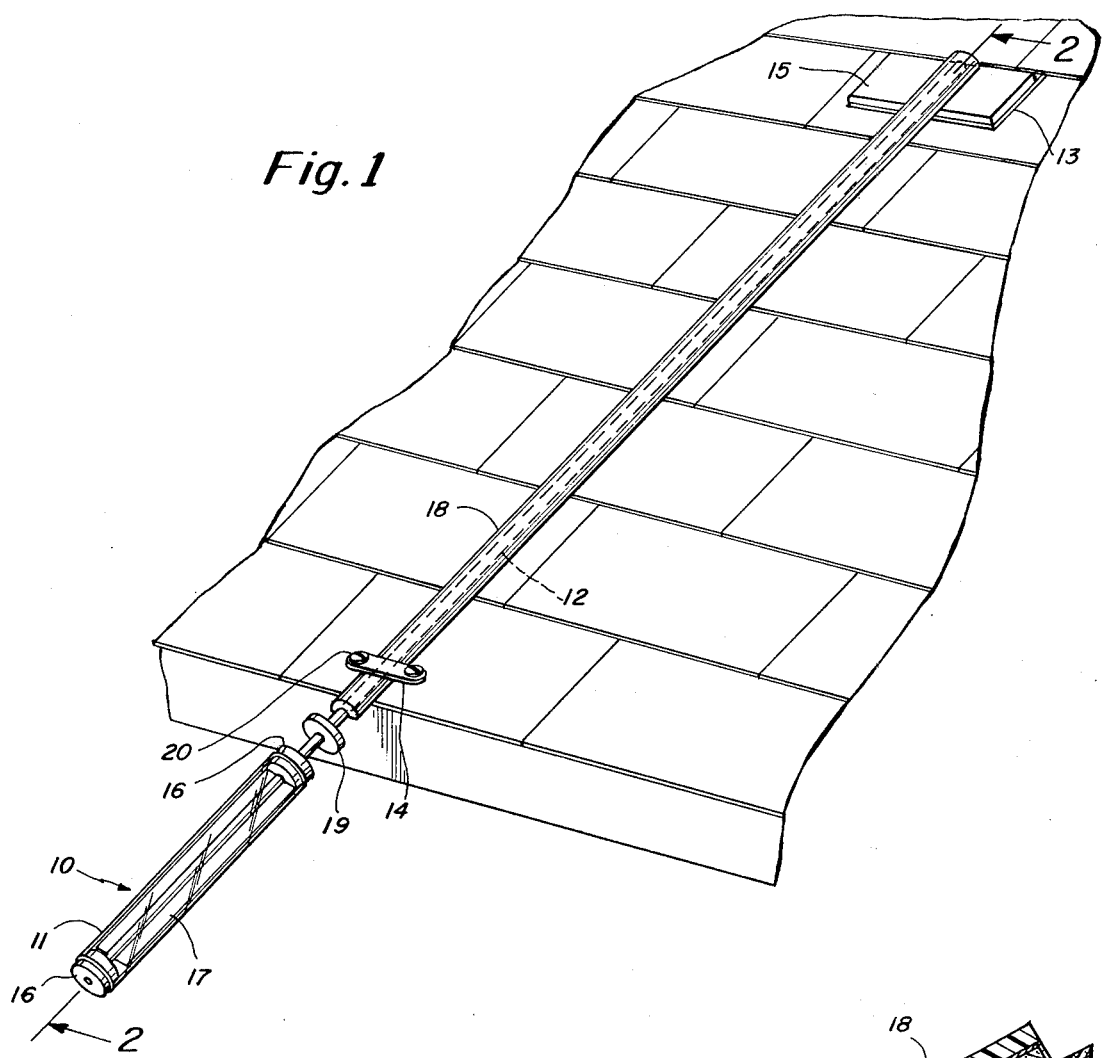
FIG. 1 is a perspective view illustrating the invention mounted in proper position upon a typical roof.
Figure 2:
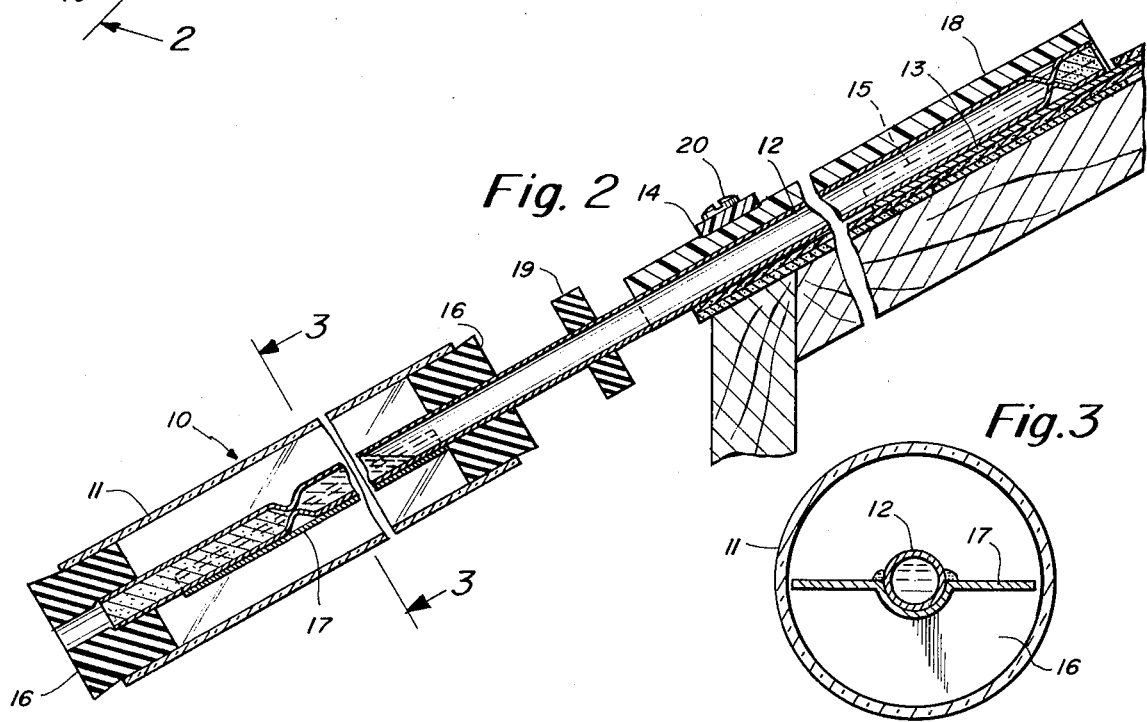
FIG. 2 is a cross-sectional view along line 2—2 of FIG. 1.
Figure 3:
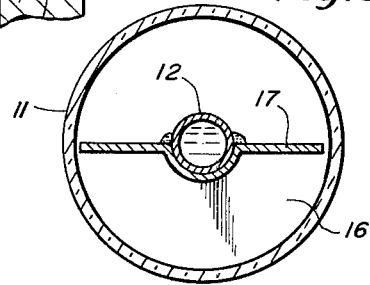
FIG. 3 is a cross-sectional view along line 3—3 of FIG. 2.

Referring to the figures in more detail, one embodiment of this device, installed on a roof, is depicted. It consists of three sections; solar collector 10 which surrounds one end of a highly conductive rod 12 whose other end is connected to optional metal plate 13 which collects heat escaping through the roof of the building. Plate 13 extends up under the overlapping shingles in order to affix the entire arrangement in place of the roof as well as maximize heat collection. Plate 13 as coverd by an insulating sheet 15 formed from a material such as neoprene or plastic foam. The lower end of rod 12 is held by a clamp 14 which is shown attached to the roof by two screws 20. Roof collector plate 13 is tightly affixed to conductor rod 12 so that it rigidly holds rod 12 in position ans so that a path of high heat conductivity is maintained at the junction. The portion of plate 13 which does not extend between the shingles is covered on its top side with insulator sheet 15 in order to reduce the heat leakage to the environs. Heat rising through the roof and shingles is collected by plate 13 and conducted to rod 12 supplementing the solar power.

Solar collector 10 consists of an optically clear, hollow tube 11 with rubber or neoprene stoppers 16 at both ends. Stoppers 16 are provided with axial holes through which passes conductive rod 12, securing it to tube 11. A metal fin 17 is attached to conductive rod 12, within tube 11. Fin 17 is blackened on one side so as to absorb solar rays, and conducts heat energy to rod 12. Tube 11 allows radiant energy to pass from outside to inside, but prevents thermal energy from escaping, thus insulating fin 17 as does a greenhouse.

Rod 12 is highly heat conductive and removes the heat from the collectors and conducts it along its length and into the surrounding ice. This melts the ice near the surface of the rod and the water from this melt and from the puddle behind the ice dam runs down along the rod past the edge of the roof and drips off. The melted tunnel through the ice need not be as large as is the rod, whose size is determined by the conductivity and mechanical strength. If the tunnel is small more energy per area can be directed into it. To accomplish this, rod 12 may be partially surrounded by insulator jacket 18 of neoprene or plastic foam which reduces the heat loss to the surroundings everywhere but at the small section of the rod which is uninsulated. The insulation should be positioned such that the uninsulated area is at the bottom of the rod so that the tunnel forms below it.

Conductive rod 12 can be made in a variety of ways. Most simply it can be of fairly large diameter, solid, and of a highly conductive material such as copper. The same conductivity can be obtained with the use of a thin metal tube, sealed at both ends, empty except for a small amount of a low boiling temperature liquid and its vapors. Ammonia and Freon are examples of such a liquid. At any temperature some of the liquid is vaporized, a pressure exists in the tube, and an equilibrium between the amount of liquid and the amount of vapor is reached. As the sun heats the lower end of the rod and the puddle of liquid in it, more vapor is boiled off. Because it is hotter and less dense, this vapor is quickly dissipated throughout the tube, carrying its heat with it. This is a highly efficient means of heat transferral and keeps the temperature nearly constant throughout the length of the tube. The thin metal walls of the tube conduct the heat to the ice. The cooled vapor at the wall condenses and flows down the tube to the puddle at the bottom. A circulation of hot vapor up the tube and cooler liquid down the tube is thus obtained.

Since the liquid only flows down, heat is not conducted from the roof plate very efficiently. If wick is incorporated into the tube, the arrangement becomes what is known as a "heat pipe". If either end is heated, the liquid in the wick is boiled off and the heat is conveyed away with the vapor. This condenses at the cold surface, and the liquid is wicked back to the hot end, thus providing a circulation of heat even against the force of gravity.

Washer 19 of rubber, neoprene or plastic encircles the conductive rod 12 near the solar collector 11. Water flowing down the rod 12 is deflected by this washer 19 and falls away. This reduces the chance of ice forming on the solar collector. Therefore, washer 19 serves as one embodiment of a means for preventing water from reaching solar collector 10.

Typically, rod 12, plate 13, and fin 17 are constructed from highly conductive and non-corrosive metals such as copper or aluminum. Tube 11 is glass or acrylic or other material which is transparent in the optical and near infrared spectrums and has good mechanical and chemical resistance to sunlight, weather, temperature extremes, and air pollution.

The financial constraints imposed by the marketplace may require that the device be somewhat simplified from the embodiment described. A likely commercial product consists of solar collector 10 comprising acrylic tube 11, rubber stoppers 16, and aluminum fin 17 attached to aluminum tube 12. Tube 12 is evacuated, partially filled with Freon and sealed. The arrangement is affixed to the roof with the clip 14 and a similar clip located near the top end of rod 12.

While one embodiment of the invention is described and illustrated, various changes may be made herein without departing from the scope and spirit of the claims. For example, collector fin 17 can be replaced by a reflective coating applied to one-half of the inside surface of tube 11. When properly aimed at the sun, this concave mirror focuses the solar energy on the blackened heat conducting rod 12, through which it is transported to the ice. Stoppers 16 can be replaced with molded plastic caps. Heat conducting rod 12 may be a closed tube containing a liquid of high heat capacity together with means for moving this liquid up and down the tube. Another embodiment of solar collector 10 is fin 17 attached to heat conductive rod 12 with a foam insulator bonded to its non-radiant absorbtive side and a flat window moled on the blackened side. The device would operate even if all insulation, including tube 11 or its alternatives, were not incorporated, although of course with reduced effectiveness. Clamp 14 and screws 20 can be replaced with a clamp similar to a "C" clamp which holds the rod 12 firmly against a shingle or edging piece.

It will be understood that various other changed in the details, materials, steps, and arrangements of parts which have been described and illustrated in order to explain the nature of the invention will occur to and may be made by those skilled in the art upon a reading of this disclosure and such changes are intended to be included within the principle and scope of this invention which is limited only by the claims attached hereto.

I claim:

1. An apparatus for preventing damage caused by an ice dam on the roof of a structure comprising:
   a tube, sealed at both ends and having a low boiling temperature liquid therein, the tube being of a length sufficient to extend outwardly from a roof to support a solar collector and to extend upwardly along the roof a substantial distance to extend through potential ice dams over the eaves of the roof and provide a tunnel through the ice dams; and
   a solar collector mounted to the tube to extend from the roof into the atmosphere, the collector including a longitudinally extending absorber surface in close thermal contact with the tube and positioned in an enclosure having a transparent face spaced from and extending along the length of the absorber surfce.

2. An apparatus for preventing damage caused by an ice dam on the roof of a structure comprising:
   a tube, sealed at both ends and having a low boiling temperature liquid therein, the tube being of a length sufficient to extend outwardly from a roof to support a solar collector and and to extend upwardly along the roof a substantial distance to extend through potential ice dams over the eaves of the roof and provide a tunnel through the ice dams; and
   a solar collector mounted to the tube to extend from the roof into the atmosphere, the collector including a longitudinally extending heat absorbing and conducting fin in close thermal contact with a length of the tube.

3. An apparatus of claim 1 wherein the enclosure is an optically clear hollow enclosure surounding the end portion of the tube.

4. An apparatus of claim 1 or 2 further including deflector means for preventing water from flowing from the roof along the tube to the collector.

5. An apparatus of claim 4 wherein the deflector means is a washer encircling the tube.

6. An apparatus of claim 1 or 2 additionally including heat collection means for collecting heat escaping through the roof.

7. An apparatus of claim 6 further comprising a bracket which can be screwed or clamped to said roof.

8. An apparatus of claim 6 wherein the heat collection means is a flat metal plate capable of being inserted between roof shingles in intimate contact with the heat conducting tube.

9. An apparatus of claim 1 or 2 additionally including insulation partially surrounding the heat conducting tube.

10. An apparatus of claim 1 wherein said absorber surface comprises a longitudinally extending heat conducting fin, blackened on one side, and in intimate contact with the tube. tube.

11. An apparatus of claim 2 additionally including an optically clear hollow enclosure surrounding the heat conductive fin and end portion of the tube.

12. An apparatus of claim 1 or 2 wherein the tube is a heat pipe, having a wick therein.

* * * * *